United States Patent
Edwards et al.

(10) Patent No.: US 6,509,106 B1
(45) Date of Patent: Jan. 21, 2003

(54) BLENDS CONTAINING LINEAR LOW DENSITY POLYETHYLENE, HIGH DENSITY POLYETHYLENE, AND LOW DENSITY POLYETHYLENE PARTICULARLY SUITABLE FOR EXTRUSION COATING AND FILMS

(75) Inventors: Ray Edwards, Henderson, TX (US); Bruce Alexander Gillespie, Overton, TX (US); Diane Hines Farnham, Longview, TX (US)

(73) Assignee: Eastman Chemical Company, Kingsport, TN (US)

( * ) Notice: Subject to any disclaimer, the term of this patent is extended or adjusted under 35 U.S.C. 154(b) by 227 days.

(21) Appl. No.: 09/717,672

(22) Filed: Nov. 21, 2000

Related U.S. Application Data

(63) Continuation-in-part of application No. 09/291,793, filed on Apr. 14, 1999, now abandoned.
(60) Provisional application No. 60/096,995, filed on Aug. 18, 1998.

(51) Int. Cl.$^7$ ............................................... B32B 27/32
(52) U.S. Cl. ........................ 428/523; 428/515; 428/516; 525/240; 156/244.11
(58) Field of Search ................................ 428/523, 515, 428/516; 525/240; 156/244.11

(56) References Cited

U.S. PATENT DOCUMENTS

| | | | |
|---|---|---|---|
| 4,339,507 A | | 7/1982 | Kurtz et al. |
| 4,359,553 A | * | 11/1982 | Edwards ..................... 525/240 |
| 4,378,451 A | * | 3/1983 | Edwards ..................... 525/198 |
| 4,528,312 A | * | 7/1985 | Edwards ..................... 174/89 |
| 5,536,542 A | * | 7/1996 | Gillespie et al. ....... 156/244.11 |
| 5,756,193 A | * | 5/1998 | Yamamoto et al. ......... 428/220 |
| 5,792,534 A | * | 8/1998 | deGroot et al. .......... 428/36.92 |
| 5,863,665 A | * | 1/1999 | Kale et al. ............. 264/171.23 |
| 6,110,599 A | * | 8/2000 | Edwards et al. ............ 428/461 |

FOREIGN PATENT DOCUMENTS

| | | |
|---|---|---|
| EP | 241 234 A2 | 10/1987 |
| EP | 359 440 A2 | 3/1990 |
| EP | 735 090 A1 | 10/1996 |

* cited by examiner

*Primary Examiner*—D. Lawrence Tarazano
(74) *Attorney, Agent, or Firm*—Jonathan D. Wood; Bernard J. Graves, Jr.

(57) ABSTRACT

A novel composition of at least three different polyethylene-based components is provided. The blend comprises a linear low density polyethylene, a high density polyethylene and a low density polyethylene. The composition can be used in extrusion coating, in preparing films, cast or blown included, and other applications, such as laminates.

19 Claims, 2 Drawing Sheets

BLENDS CONTAINING LINEAR LOW DENSITY POLYETHYLENE, HIGH DENSITY POLYETHYLENE, AND LOW DENSITY POLYETHYLENE PARTICULARLY SUITABLE FOR EXTRUSION COATING AND FILMS

CROSS-REFERENCE TO RELATED APPLICATIONS

This is a continuation-in-part application of application Ser. No. 09/291,793, filed Apr. 14, 1999 now abandoned, which claims the benefit of Provisional Application Ser. No. 60/096,995 filed on Aug. 18, 1998.

This is a continuation-in-part application of application Ser. No. 09/291,793 (the '793 application) filed on Apr. 14, 1999; the entire content of which is hereby incorporated by reference. The '793 application claims the benefit of priority under 35 USC 119 §(e) of United States Provisional Application Ser. No. 60/096,995, filed Aug. 18, 1998; the entire contents of which are also hereby incorporated by reference.

FIELD OF THE INVENTION

The present invention relates to a composition comprising a blend of at least three polyethylene components particularly useful for extrusion coating, a process using such blends for extrusion coating, and the composite produced thereby. The invention also relates to films produced from the blends.

BACKGROUND OF THE INVENTION

Prior art polyolefin blends, containing linear low density polyethylene as a component, are useful in certain extrusion coating applications. One such prior art blend is Dow Chemical's Dowlex 3010 linear low density polyethylene, which contains at least 80 weight percent linear low density polyethylene. Examples of extrusion coating applications are structures such as flexible polymeric film/paper packages for foods, and metallized polymeric film balloons. The linear low density polyethylene component in the prior art blends provides strong heat seals (coating-to-coating); strong tensile properties of coatings; strong resistance of coatings to tear; high resistance of coatings to missile, or dart, impact; resistance of coatings to puncture; and coating stress crack resistance. These properties are generally not attainable with polyolefin blends which contain no linear low density polyethylene. However, these prior art blends containing linear low density polyethylene exhibit certain undesirable processing problems.

The prior art blends, that contain high levels of linear low density polyethylene, i.e., 80 weight percent and greater, generally require excessive power (extruder motor drive watts) to be extruded during the extrusion coating operation. Frequently, the production rates of an extrusion coating operation must be slowed so as not to exceed the limits of the extruder drive motors. In many cases, productivity is so low as to result in economic losses.

Further, the prior art blends, that contain high levels, i.e., 80 weight percent and greater, of linear low density polyethylene, generally exhibit excessive extrudate edge bead, manifested by excessive neck-in of the molten extrudate. This is a problem readily known to those skilled in the art of extrusion coating. Excessive edge bead must be trimmed away and disposed of as scrap. Otherwise, a final coated structure will not exhibit a uniform thickness.

It would obviously be desirable in an extrusion coating operation to utilize a polyolefin composition containing linear low density polyethylene as a component which would extrude at significantly lower power requirements and with significantly less edge bead. It would further be desirable for that same polyolefin composition containing linear low density polyethylene as a component to retain the desired coating properties exhibited by the prior art two component polyolefin blends containing linear low density polyethylene as the major component of the two components. The properties include strong heat seals (coating-to-coating); strong tensile properties of coatings; strong resistance of coatings to tear; high resistance of coatings to missile, or dart, impact; coating puncture resistance; and resistance of coatings to stress cracking.

SUMMARY OF THE INVENTION

The present inventors have unexpectedly discovered an improved extrusion coating polyolefin composition comprising a blend of a linear low density polyethylene, a high density polyethylene, and a low density polyethylene. The composition of the present invention desirably extrudes with lower power requirements (extruder drive motor watts) than the prior art two component blends containing linear low density polyethylene. This occurs even though the compositions of the present invention require significantly more thermal energy per unit of mass to melt than is required by the prior art blends. The compositions of the present invention exhibit significantly less neck-in (less edge bead) than that exhibited by the prior art compositions.

The composition according to the present invention is a polyolefin blend comprising at least the following three components. The first component is a linear low density polyethylene which generally provides coating-to-coating heat seal strength, toughness, tear resistance, and puncture resistance. In general, the properties are essentially equal to those exhibited by the prior art compositions. The second component is a high density polyethylene copolymer which generally provides tensile strength and stress crack resistance properties. The properties are generally substantially equal to the prior art compositions. The third component is a low density polyethylene homopolymer which generally contributes to a reduced edge bead by providing a lower neck-in of the molten extrudate. Generally, this property of neck-in is superior to the prior art compositions. Moreover, the third component also generally provides good wetting of the substrate surface to which the blend is coated, for good coating-to-substrate bonding. Accordingly, the present invention that contains a lower amount of linear low density polyethylene than prior art compositions is utilized without a loss in coating properties that would be normally expected with a reduction in linear low density polyethylene content.

The present invention is also directed to an improved extrusion coating process comprising the use of the above-mentioned composition of at least a linear low density polyethylene, a high density polyethylene, and a low density polyethylene. Further, the present invention is also directed to a coated article or composite comprising a substrate, either primed or unprimed, having the aforementioned composition coated thereon, preferably by means of an extrusion coating process. The primer used to provide bonding to a substrate is preferably a water-soluble primer, more preferably a polyethyleneimine primer. Furthermore, the present invention includes laminates wherein a layer of the aforementioned three component composition is utilized between two similar or dissimilar substrates, optionally including a primer layer between the polyethylene blend and each substrate. The resultant composite or laminate may be formed into an article, such as a package for food, having good barrier properties, that is, the package is generally impermeable to liquids and gases. The present invention is also directed to films prepared from the novel compositions, particularly by means of cast or blown film techniques.

It is, therefore, an object of the invention to provide novel compositions comprising a blend of at least a linear low density polyethylene, a high density polyethylene, and a low density polyethylene.

Another object of the invention is to provide an improved extrusion coating process wherein there is utilized as the extrusion coating, the novel compositions comprising the blends of the present invention as defined herein.

It is a further object of this invention to provide a coated substrate or a composite wherein the coating composition comprises the novel blends of the present invention as defined herein.

A still further object of this invention is to provide a coated substrate or a composite wherein the coating composition comprising the novel blends of the present invention is applied onto the substrate by an extrusion coating process.

These and other objects and advantages of the invention will be apparent to those skilled in the art from the following detailed description, preferred embodiments, specific examples, and claims.

DETAILED DESCRIPTION OF THE INVENTION

Figure 1:
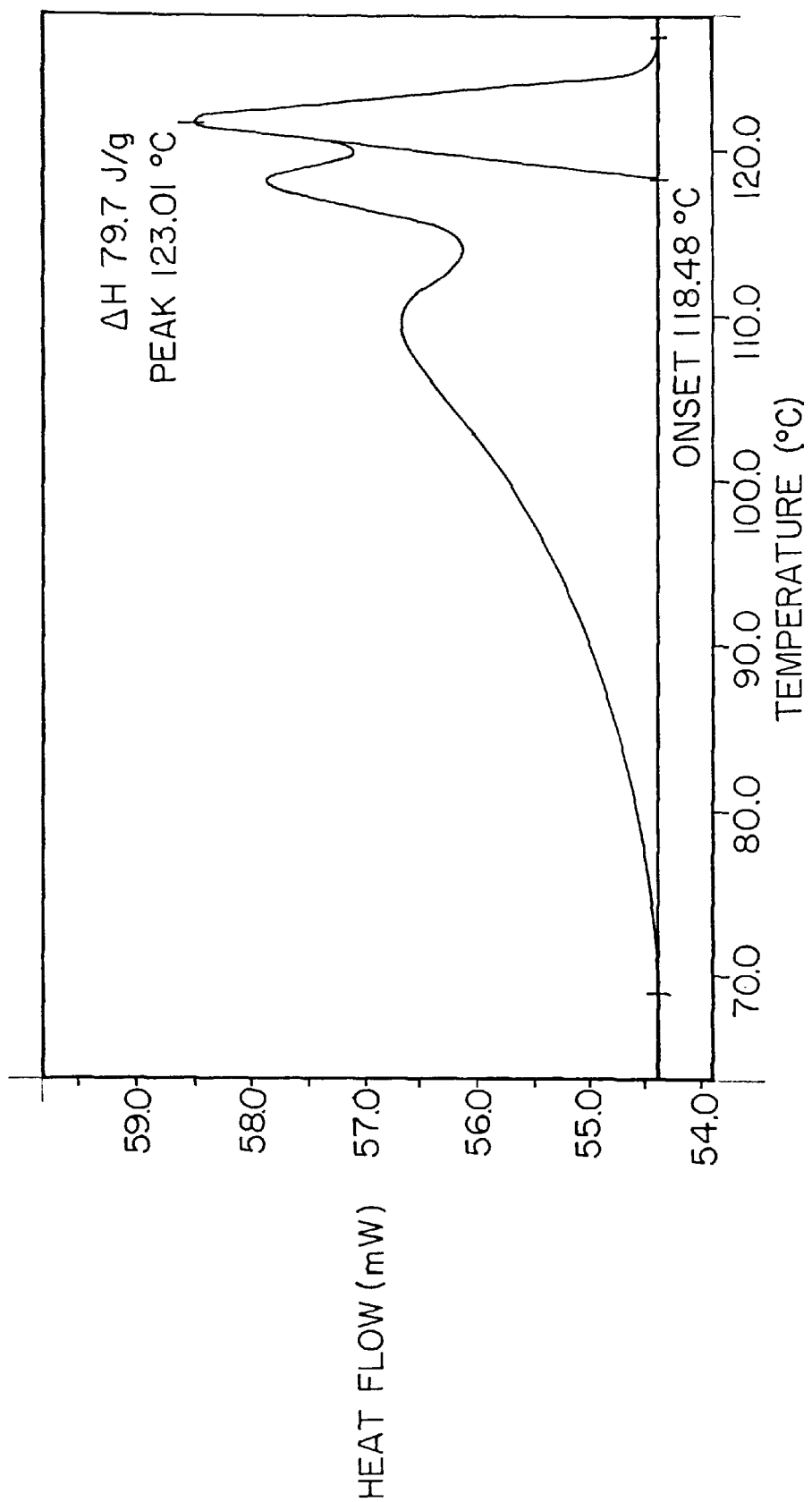
FIGS. 1 and 2 are obtained using differential scanning calorimetry (DSC) to determine melting point profiles, in particular, the maximum melting point and the thermal energy per unit mass required to melt the mass. The melting point profile and pertinent calorimetry data of the prior art two component blend is shown in FIG. 1. The melting point profile and pertinent calorimetry data of a three component blend of the present invention is shown in FIG. 2.

The novel compositions of the present invention comprise blends of a linear low density polyethylene, a high density polyethylene, and a low density polyethylene.

The linear low density polyethylene component of the blend is known to generally provide heat seal strength, toughness, tear resistance and puncture resistance properties to an extruded coating. The linear low density polyethylene component of the composition is a low density polyethylene copolymer comprising ethylene and a $C_3$–$C_{10}$ alpha-olefin comonomer. The alpha-olefin comonomer is preferably a $C_6$–$C_8$ alpha-olefin, and more preferably an ethylene-hexene or ethylene-octene copolymer. The alpha-olefin comonomer is preferably present in an amount of about 5 to about 20 percent by weight of the ethylene-alpha olefin copolymer, more preferably an amount of from about 7 to about 15 percent by weight. The ethylene-alpha olefin copolymer component is further characterized by having a melt index value measured at 190° C., of about 0.5 dg/min. to about 10 dg/min., more preferably from about 1 dg/min. to about 3 dg/min., and most preferably is about 2 dg/min.; a swell ratio of about 1.0 to about 1.2; an annealed density of about 0.90 g/cc to about 0.93 g/cc; and a polydispersity index of about 1 to about 4. The ethylene-alpha olefin linear low density copolymers may be produced by any method known in the art such as, for example, described in U.S. Pat. No. 4,339,507.

The linear low density ethylene copolymer component of the blend of the present invention is present in an amount of about 25 to about 40 weight percent, based on the weight of the blend, more preferably in an amount of from about 30 to about 35 weight percent, and most preferably, in an amount of about 33 weight percent, based on the weight of the blend.

The high density polyethylene component of the blend is known to generally provide tensile strength and stress crack resistance to the blend of the present invention. The high density polyethylene component of the novel composition is a homopolymer of ethylene or a copolymer of ethylene and an alpha olefin comonomer. The alpha olefin comonomer preferably has about 3 to about 10 carbon atoms. The alpha olefin comonomer is preferably present in an amount of about 0.2 to about 1 percent by weight of the copolymer, more preferably about 0.4 to about 0.7 percent by weight, and still more preferably in an amount of about 0.5 percent by weight, based on the weight of the copolymer. The preferred comonomer is hexene. The high density polyethylene component is further characterized as having an annealed density of at least 0.940 g/cc to about 0.97 g/cc, more preferably from about 0.95 g/cc to about 0.97 g/cc; a melt index of about 6 dg/min. to about 20 dg/min., more preferably about 14 dg/min. to about 18 dg/min., and most preferred about 16 dg/min., measured at 190° C. The high density polyethylene component may be produced by any method known in the art, such as, for example, that described in U.S. Pat. No. 4,339,507.

The high density polyethylene component of the blend of the present invention is present in an amount of from about 25 to about 40 weight percent. based on the weight of the blend, more preferably, in an amount of from about 30 to about 35 weight percent, and most preferably in an amount of about 33 weight percent, based on the weight of the blend.

The low density polyethylene component of the blend of the present invention generally provides good wetting of a substrate to allow a good bonding to the substrate. The low density polyethylene component of the novel composition is a polyethylene of broad molecular weight distribution, as indicated by having a polydispersity index above 9 to about 12. The low density polyethylene is further characterized by having a melt index value of about 3 dg/min. to about 40 dg/min., more preferably from about 6 dg/min. to about 30 dg/min., still more preferably from about 18 dg/min. to about 22 dg/min., and most preferably about 20 dg/min., measured at 190° C. The low density polyethylene is further characterized by having an annealed density of from about 0.90 g/cc to about 0.93 g/cc.

The low density polyethylene component of the blend of the present invention is present in an amount of from about 25 to about 40 weight percent, based on the weight of the blend, more preferably in an amount of from about 30 to about 35 weight percent, and most preferably, in an amount of about 33 weight percent, based on the weight of the blend.

The novel compositions of the present invention may be prepared using any method known in the art. For example, the compositions may be prepared by dry blending or tumbling in any conventional equipment or by mixing in any conventional mixing equipment such as single and twin screw extruders, Werner Pfleiderer mixers, Banbury mixers or the like.

As will become apparent hereinafter, it has been found that less power is required to extrude the compositions of the present invention than the prior art blends. This is quite unexpected since the novel compositions of the present invention require a greater amount of thermal energy to be melted than is necessary to melt the prior art blends.

The substrate to which the blend of the present invention is applied is preferably a primed substrate. The primer is preferably a water-soluble primer. More preferably, the substrate is primed with polyethyleneimine. After priming, the primed surface is then extrusion coated with the blend. The polyethyleneimine used to prime the various substrates to be extrusion coated with the blends of the present invention is most preferably MICA Corporation's A-131-X polyethyleneimine primer. Extrusion coating methods are well known in the art. One skilled in the art can readily extrusion coat or extrusion laminate a composition of the present invention onto primed or unprimed surfaces to prepare a composite or laminate.

The composition of the present invention may be extrusion coated to a substrate or extrusion laminated between two substrates. Extrusion coating and laminating means and methods are well known in the art, and it is expected that any of such methods may be utilized in the present invention. It is also possible to coextrusion coat the novel compositions to a structure of at least one or more substrates. The laminating process may further include the step of preparing a film from the composition of the present invention. The film may be, for instance, a cast or blown film. The skilled artisan would be well aware of the methods available in the art to prepare a film from the blends of the present invention. There are many methods known in the art for preparing film using cast or blown film techniques.

The substrate to which the blends of the present invention may be coated or laminated may be any substrate to which polyolefins are normally coated. Examples of suitable substrates include, but are not limited to, paper or paperboard (printed or unprinted), coated, e.g. clay-coated or uncoated, metal foils, plastic films and the like. These surfaces may be primed or unprimed, with a preference for primed surfaces.

A laminate according to the present invention comprises two substrates, each of which may be independently primed or unprimed on the surface facing the other substrate, with the composition of the present invention between the substrates. In such a laminate, the substrates may be similar or dissimilar. For example, the substrates may both be paper or one substrate may be paper and the other substrate may be a polymeric film.

The skilled artisan can determine optimum conditions for coating or laminating without difficulty.

Films may be produced from the novel compositions of the present invention by any known technique. Preferred herein are the cast and blown film techniques, both of which are well known in the art.

The composition of the present invention can contain other ingredients, such as additional polyethylene components, fillers, slip agents, tackifiers, pigments, and the like, as known in the art, provided the compositions are not adversely affected.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLES

In the following examples the test procedures listed below were used in evaluating the analytical properties of the polyethylenes herein and in evaluating the physical properties of the compositions of the examples.

Melt Index, dg/min., was determined in accordance with ASTM D1238-62T at 190° C. (374° F.).

Swell Ratio is defined as the ratio of the extrudate over that of the orifice diameter of the extrusion plastometer in ASTM D1238-62T. The diameter of the specimen is measured in the area between 0.159-cm and 0.952-cm of the initial portion of the specimen as it emerges from the extrusion plastometer. Measurements were made by standard methods according to ASTM D374.

Annealed Density, g/cc, was determined in accordance with ASTM D1505.

Polydispersity Index is the ratio of the weight-average molecular weight, Mw, to number-average molecular weight, Mn. Mw and Mn were obtained by size-exclusion chromatography on a Waters 150C gel permeation chromatograph equipped with the standard refractometer detector and a Viscotek 150R differential viscometer system. The 3-column set consisted of Waters' $10^3$, $10^4$, and linear-mixed bed ($10^3$, $10^4$, and $10^5$) Micro-Styragel HT columns. The samples were run as 0.125% weight-to-volume solutions in ortho-dichlorobenzene at 140° C. The data were interpreted using Viscotek Unical software (V4.02), by universal calibration using NBS 1475 (linear polyethylene) and NBS 1476 (branched polyethylene) for any polyethylene sample.

Differential Scanning Calorimetry maximum melting points, °C., and the energy required to melt a given mass of polyolefin, expressed in Joules/gram, were determined in accordance with ASTM D3418.

Neck-In, inches/edge or cm/edge was determined by first measuring the width of an extrusion coating, W, on a substrate, and then subtracting that measurement from the width of the extrusion coating die, D. The difference, (D–W) is then divided by 2, i.e. (D–W)/2, resulting in the amount of extrudate neck-in per edge.

Ultimate Heat Seal Strength, grams force, was determined on a Theller Model HT tack heat sealer as described in U.S. Pat. No. 5,331,858.

Tensile Properties, tensile strength at fracture and tensile strength at yield, both expressed in lb/in$^2$ (or megapascals); and elongation at break, expressed in percent, were determined in accordance with ASTM D882.

Tear Strength, expressed in grams-force, or millinewtons, was determined in accordance with ASTM D1992.

Dart Impact Resistance, grams at 50% failure, was determined in accordance with ASTM D1709A.

Puncture Resistance, lb/mil, was determined in accordance with ASTM D4649.

Stress Crack, hours to 50% failure ($F_{50}$) was determined in accordance with ASTM D1693–94.

Example 1 (Comparative)

In this example, the composition utilized was Dow Chemical Company's Dowlex 3010 polyethylene, which is believed to be a blend of about 80 weight percent ethylene-octene copolymer, containing about 7 to about 10 weight percent octene, and about 20 weight percent low density polyethylene. Further, the blend has a melt index of 5.8 dg/min. at 190° C. and an annealed density of 0.922 g/cc.

Pellets of the Dowlex 3010 blend were tested using differential scanning calorimetry to determine the melting point profile, particularly the maximum melting point and the thermal energy per unit mass required to melt the mass. The melting point profile and calorimetry data obtained for the Dowlex 3010 blend are shown in FIG. 1.

The Dowlex 3010 blend was extrusion coated, a process well known in the art, to a 40 pound natural Kraft paper. The Dowlex 3010 blend was applied to the Kraft paper at a melt temperature of 601° F. (317° C.), from a 3.5 inch diameter extruder with its barrel heaters set at 397° F. (203° C.), 500° F. (260° C.), 600° F. (315° C.) and 645° F. (340° C.). The extrusion die throughput rate was maintained constant at 10 lb/inch/hr (1.8 kg/cm/hr) of die width. Extruder power, measured in percent motor load, and kilowatts required to extrude the Dowlex 3010 blend, at the constant extruder throughput rate, are shown in Table I. Also shown in Table I is the energy required to melt a given mass of the Dowlex 3010 blend, as well as the maximum melting point of the Dowlex 3010 blend.

Example 2

A composition of the present invention was prepared by dry blending the following components:

(a) 33 weight percent of Eastman Chemical Company's CM 27057-F linear low density polyethylene, based on the weight of the composition. The linear low density polyethylene is an ethylene-hexene copolymer containing about 14.1% by weight of hexene having a melt index of about 2.0 dg/min. at 190° C., an annealed density of about 0.910 g/cc, a swell ratio of about 1.2, and a polydispersity index of about 3.

(b) 33 weight percent of Eastman Chemical Company's HT 7011-X high density polyethylene, based on the weight of the composition. The high density polyethylene is an ethylene-hexene copolymer containing about 0.7 weight % hexene, having a melt index of 16 dg/min. at 190° C. and an annealed density of 0.96 g/cc; and (c) 33 weight percent of Eastman Chemical Company's 811A low density polyethylene, based on the weight of the composition. The low density polyethylene is a polyethylene homopolymer having a melt index of about 20 dg/min. at 190° C. and an annealed density of about 0.92 g/cc. The low density polyethylene is further characterized as having a broad molecular weight distribution as reflected in a polydispersity index of about 10.

The resultant blend of the three components, which is an exemplary composition of the present invention, is characterized by having a melt index of about 5.5 dg/min. at 190° C. and an annealed density of about 0.922 g/cc.

Figure 2:
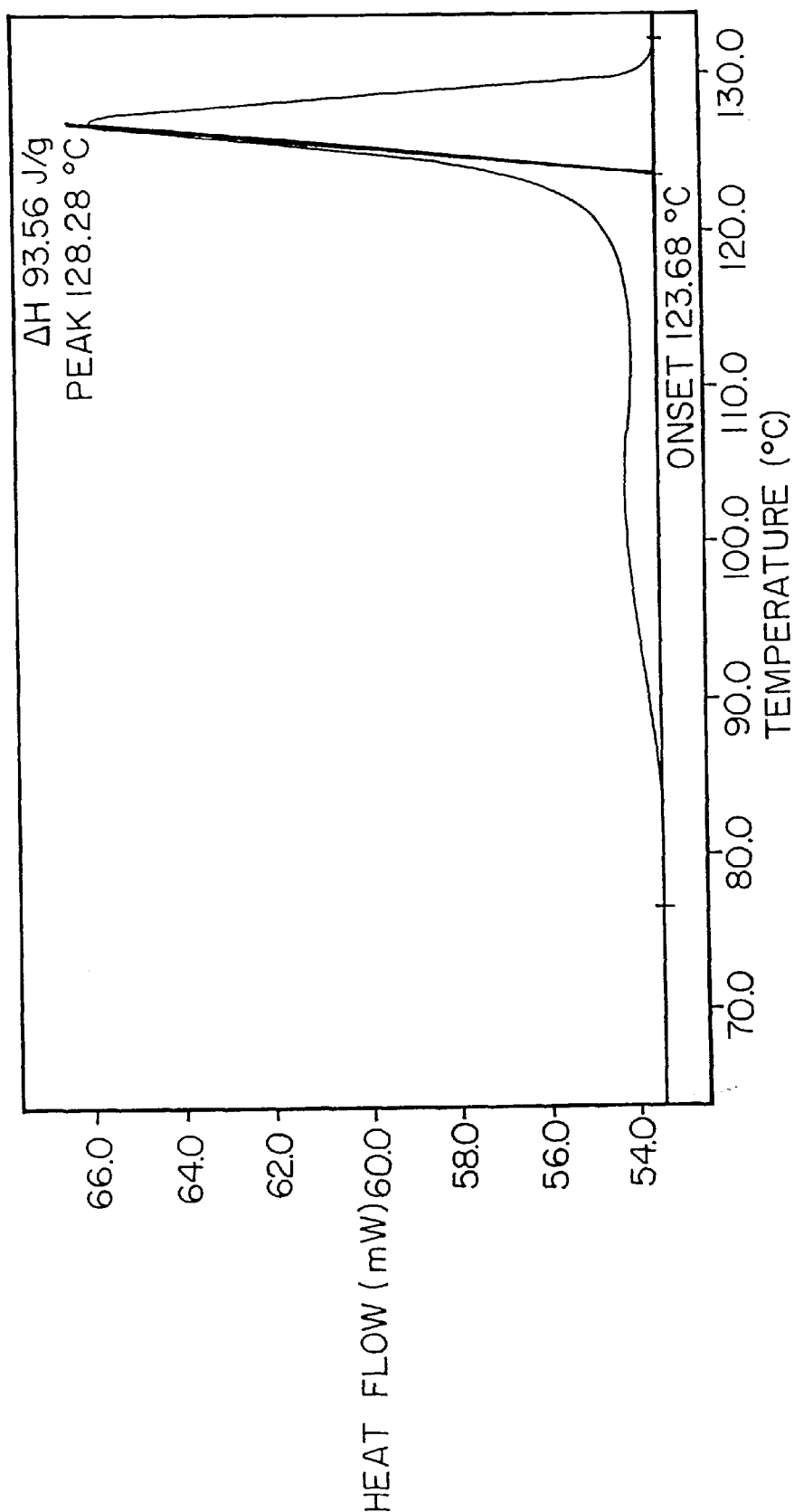

Pellets of the composition of this example were tested using differential scanning calorimetry to determine its melting point profile, particularly the maximum melting point of the blend and the thermal energy per unit mass of the composition required to melt the mass. The melting point profile and calorimetry data of the blend of this example is shown in FIG. 2.

The resultant blend of this example was extrusion coated to natural 40 lb. Kraft paper. The blend was applied at a melt temperature of 596° F. (313° C.) to the Kraft paper from a 3.5 inch diameter extruder with its barrel heaters set at 398° F. (203° C.), 499° F. (259° C.), 600° F. (315° C.) and 639° F. (338° C.). The extrusion screw was single-flighted with a compression ratio of 3.5:1, providing a uniform output through the die. The extrusion die throughput rate was held constant at 10 lb/inch/hr (1.8 kg/cm/hr) of die width. Extruder power, measured in percent motor load and kilowatts required to extrude the blend of this Example 2, noted at the constant extruder throughput rate, are reported in Table I. Also reported in Table I is the energy required to melt a given mass of the blend of this Example 2, as well as the maximum melting point of the blend.

TABLE 1

| Property | Property Units | Blend of Example 1 | Blend of Example 2 |
| --- | --- | --- | --- |
| Motor Load | Percent | 87 | 76 |
| Drive Motor Power | Kilowatts | 16.0 | 14.0 |
| Energy Required to Melt | Joules/gram | 79.7 | 93.56 |
| Maximum Melting Point of Pellets | ° C. | 123.01 | 128.28 |

From the data in Table I, the following observations can be made. The novel composition of Example 2, typical of the present invention, can be extruded using a lower extruder drive motor load than is required for the prior art blend of Example 1. In this instance, the reduction in extruder drive motor load is 12 percent.

Further, the blend of Example 2 can be extruded using less extruder drive motor power than is required for the prior art blend of Example 1. The reduction herein was 12 percent in extruder drive motor power. The lowering of extruder drive motor power permits an extrusion coating operation to produce product with greater latitude in power requirements before maximum drive motor load is exceeded.

The reduction in power requirements accompanying usage of the compositions of the present invention is quite unexpected since the data in Table I reveals that the energy required to melt a given mass of the composition of Example 2 is 15 percent greater than is required to melt a mass of the blend of Example 1 (the prior art blend). Based on the difference in thermal energies required to melt the blends of Examples 1 and 2, one would have predicted the opposite result, namely, a higher power requirement accompanying a composition of the present invention, as typified by the blend of Example 2, when compared with the prior art blend of Example 1.

Example 3 (Comparative)

In this example was used the same composition as in Example 1, namely Dow Chemical Company's Dowlex 3010 blend. The Dowlex 3010 blend was extrusion coated to natural 40 lb. Kraft paper. The Dowlex 3010 blend was applied to the Kraft paper at a melt temperature of 601° F. (317° C.) from a 3.5 inch diameter extruder with its barrel heaters set at 397° F. (203° C.), 500° F. (260° C.), 600° F. (315° C.) and 645° F. (340° C.). The extrusion die throughput rate was held constant at 10 lb/inch/hr (1.8 kg/cm/hr) of die width. The die to nip air gap was 5.25 inches (6.4 cm). Samples of the coated Kraft paper were obtained at 600 fpm (185 m/min.) and at 1000 fpm (305 m/min.) and neck-in measurements of the prior art Dowlex 3010 blend coatings were taken at each speed. The results are reported in Table II.

Example 4

The same composition as described in Example 2 herein was extrusion coated to natural 40 lb. Kraft paper. The composition was applied to the natural Kraft paper at a melt temperature of 596° F. (313° C.), from a 3.5 inch diameter extruder with its barrel heaters set at 398° F. (203° C.), 499° F. (259° C.), 600° F. (315° C.), and 639° F. (338° C.). The extrusion die throughput rate was held constant at 10 lb/inch/hr (1.8 kg/cm/hr) of die width. The die to nip air gap was 5.25 inches (6.4 cm). Samples of the coated Kraft paper were obtained at 600 fpm (185 m/min. ) and at 1000 fpm (305 m/min.), and neck-in measurements of the coating of the blend of Example 2 (typical of the present invention) were taken at each speed. The results are reported in Table II.

TABLE II

| Property | Property Units | Blend of Example 3 | Blend of Example 4 |
|---|---|---|---|
| Neck-in at 600 fpm | Inches(cm)/Edge | 2.55(6.50) | 2.40(6.10) |
| Neck-in at 1000 fpm | Inches(cm)/Edge | 2.50(6.35) | 2.30(5.85) |

A review of the data in Table II permits the following observations to be made. The compositions of the present invention, as typified by Example 4, offer lower, and therefore superior, neck-in values when compared to the prior art blend of Example 3. Lower neck-in values result in a wider extrusion coating and a reduced edge bead of the molten extrudate. Edge beads are normally slit and discarded as scrap, resulting in an economic loss. Accordingly since the compositions of the present invention are characterized by lower neck-in, and reduced edge bead, the economic loss is decreased since less is discarded as edge bead scrap when compared with use of the prior art blend of Example 3.

Example 5

The same composition of Example 1 herein, namely Dow Chemical Company's Dowlex 3010 blend, was cast into film by known techniques at a melt temperature of 603° F. (318° C.) and at a sufficient haul-off speed to obtain a film thickness of 0.001 inch (0.0254 mm). The resultant cast film was tested for heat seal strength (film to film); tensile properties; resistance to tear; resistance to missile, or dart, impact; and puncture resistance. In addition, pellets of the Dowlex 3010 blend were pressed into sheets and tested for stress crack resistance. The results are reported in Table III.

Following the aforementioned procedure, the composition of Example 2 was formed into cast film at a melt temperature of 603° F. (318° C.) at a sufficient haul-off speed to obtain a film thickness of 0.001 inch (0.0254 mm). The resultant cast film was tested for heat seal strength (film to film); tensile properties; resistance to tear; resistance to missile, or dart, impact; and puncture resistance. Pellets of the composition of Example 2 were pressed into sheets and tested for stress crack resistance. The properties are reported in Table III.

TABLE III

| Property | Property Units | Blend of Example 1 | Blend of Example 2 |
|---|---|---|---|
| Tensile Strength at Break (Machine Direction) | lb/in² (kPa) | 4230–5170 (29200–35600) | 4032–4928 (27600–34000) |
| Tensile Strength at Yield (Machine Direction) | lb/in² (kPa) | 1764–2156 (12400–14900) | 2385–2915 (16500–21000) |
| Elongation (Machine Direction) | Percent | 689–761 | 599–661 |
| Tensile Strength at Break (Transverse Direction) | lb/in² (kPa) | 3150–3850 (21800–26600) | 2625–3209 (18100–22100) |
| Tensile Strength at Yield (Transverse Direction) | lb/in² (k Pa) | 1013–1237 (7000–8500) | 1738–2124 (11900–14600) |
| Elongation (Transverse Direction) | Percent | 836–924 | 839–927 |
| Tear Strength (Machine Direction) | Grams | 82–100 | 83–93 |
| Tear Strength (Transverse Direction) | Grams | 547–667 | 642–784 |
| Dart Impact | Grams at 26-inches (63 cm) | 46–68 | 36–54 |
| Puncture Resistance | lb/mil (N/cm²) | 4.04–5.46 (367–484) | 4.26–5.76 (378–510) |
| Stress Crack Resistance | Hours (F50) | >312 | >312 |
| Ultimate Heat Seal Strength | Grams Force | 520 | 510 |

A review of the data in Table III reveals that the film/coating properties obtained when using the novel compositions of the present invention are substantially similar to those obtained when using the prior art blend of Example 1.

Example 6

The composition of Example 2 was used herein to produce blown film. Processes for producing blown film are well known in the art. In more detail, the composition of Example 2 was extruded from a 2.5 inch (6.4 cm) diameter extruder having a length to diameter ratio of 24:1, and equipped with 5 zones of heating. The annular extrusion die had a diameter of 6 inches (15.3 cm), and the die's land to land separation was uniformly set to 0.088 inch (0.224 mm). The extrudate temperature was 385° F. (196° C.). The extrudate output rate was 89 lb/hr (41 kg/hr), and the blown film's haul-off speed was 78 fpm (24 m/min.) The film blow up ratio was 2.5, resulting in a tubular lay flat width of 22.5 inch (57 cm), and a uniform film thickness of 0.001 inch (0.0254 mm). The resultant film blown from the composition of Example 2 was uniform in thickness and of overall excellent quality.

From all of the foregoing it is apparent that the novel compositions of the present invention have many applications. For example, the novel compositions may be formed into cast and blown films, using any of the well known techniques for forming cast or blown film. In addition, the novel compositions of the present invention may be used in preparing extrusion coatings having substantially equivalent film/coating properties compared to prior art compositions, but with improved processing properties, namely, a lower extruder motor drive power requirement and a lower neck-in, that is, less edge bead.

The invention has been described above in detail with particular reference to preferred embodiments thereof, but it will be understood that variations and modifications other than as specifically described herein can be effected within the spirit and scope of the invention. Moreover, all patents, patent applications, provisional patent applications, and literature references cited above are incorporated herein by reference for any disclosure pertinent to the practice of this invention.

We claim:

1. A polymer blend composition comprising:
   (a) from about 25 to about 40 weight percent based on the weight of the composition, of a first copolymer of ethylene and a $C_3$–$C_{10}$ alpha-olefin comonomer having a melt index, at 190° C., of about 0.5 to about 10 dg/min., a swell ratio of about 1.0 to about 1.2, an annealed density of about 0.90 to about 0.93 g/cc, and a polydispersity index of about 1 to about 4;

(b) from about 25 to about 40 weight percent, based on the weight of the composition, of a first homopolymer of ethylene or a second copolymer of ethylene and a $C_3$–$C_{10}$ alpha-olefin comonomer wherein the first homopolymer of ethylene and the second ethylene-alpha-olefin copolymer have an annealed density of at least 0.940 g/cc to about 0.97 g/cc, and a melt index at 190° C., of from about 6 to about 20 dg/min.; and (c) from about 25 to about 40 weight percent, based on the weight of the composition, of a second homopolymer of ethylene having a polydispersity index greater than 9 to about 12, a melt index, at 190° C., of from about 3 to about 40 dg/min., and an annealed density of from about 0.90 to about 0.93 g/cc.

2. The composition according to claim 1 wherein the alpha olefin comonomer of the first ethylene-alpha-olefin copolymer has 6 to 8 carbon atoms.

3. The composition according to claim 1 wherein the first ethylene-alpha olefin copolymer has a melt index of from about 1 to about 3 dg/min., at 190° C.

4. The composition according to claim 1 wherein the first homopolymer of ethylene and the second ethylene-alpha olefin copolymer have an annealed density of from about 0.95 to about 0.97 g/cc and a melt index, at 190° C., of from about 14 to about 18 dg/min.

5. The composition according to claim 1 wherein the second homopolymer of ethylene has a melt index, at 190° C., of from about 18 to about 22 dg/min.

6. The composition according to claim 1 wherein each of (a), (b) and (c) is present in an amount of from about 30 to about 35 percent by weight, based on the weight of the composition.

7. The composition according to claim 1 wherein the alpha olefin comonomer of the first copolymer is present in an amount of from about 5 to about 20 weight percent, based on the weight of the first copolymer.

8. The composition according to claim 7 wherein the alpha olefin comonomer of the first copolymer is present in an amount of from about 7 to about 15 weight percent.

9. The composition according to claim 1 wherein the alpha-olefin comonomer of the second copolymer is present in an amount of about 0.2 to about 1 percent by weight, based on the weight of the second copolymer.

10. The composition according to claim 1 wherein the alpha olefin comonomer of the first copolymer is present in an amount of from about 5 to about 20 weight percent, based on the weight of the first copolymer, and wherein the alpha-olefin comonomer of the second copolymer is present in an amount of about 0.2 to about 1 percent by weight, based on the weight of the second copolymer.

11. A process comprising extrusion coating onto a substrate a composition according to claim 1.

12. The process according to claim 11 wherein the substrate is a primed substrate.

13. An article comprising a substrate and a coating thereon wherein the coating comprises the composition according to claim 1.

14. The article according to claim 13 further comprising a primer coating applied between the substrate and the coating.

15. The article of claim 13 prepared by extrusion coating the composition according to claim 1 onto the substrate.

16. A film formed from the composition according to claim 1.

17. A cast film formed from the composition according to claim 1.

18. A blown film formed from the composition according to claim 1.

19. An article wherein a film produced from the composition according to claim 1 is a component of a multi laminate structure.

* * * * *